3,041,236
GERMICIDES CONTAINING TRIFLUOROMETHYL HALOGENATED SALICYLANILIDES
Herbert C. Stecker, 113 Hollywood Ave., Hohokus, N.J.
No Drawing. Filed Sept. 18, 1959, Ser. No. 840,818
7 Claims. (Cl. 167—31)

This invention relates to germicides and germicidal compositions containing certain halogenated salicylanilides having the trifluoromethyl group as a substituent. More specifically, it relates to germicides containing salicylanilides having a trifluoromethyl group in the anilid portion of the molecule and one to three non-adjacent halogen substituents which are also non-adjacent to the trifluoromethyl radical.

Halogen-substituted salicylanilides are known in the art as germicides. Among the most potent of these compounds are the 3,5,4′-trihalo salicylanilides. In the art, the trifluoromethyl group has not been considered as having any particular germicidal-enhancing activity. In fact, no particularly special germicidal effect in this grouping is known to have been established.

According to the present invention, the addition of a trifluoromethyl group in a specific anilide position greatly increases the germicidal effect of one or two halogens present in specific salicyl and anilide positions. In fact, the compounds so formed are much more potent than even the best of the polyhalogenated salicylanilides, such as the 3,5,4′-trihalo compounds.

The germicides of the present invention are encompassed by the following general structural formula:

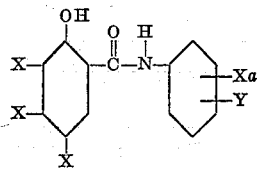

wherein X is a halogen atom selected from the class consisting of chlorine, bromine and iodine, or hydrogen, Y is a trifluoromethyl group (—CF₃), and $a$ is a number ranging from 0 to 2. These compounds must contain at least one and not more than three halogens (other than the halogens in Y) which must not be adjacent to each other or to the trifluoromethyl group, and they must contain only one trifluoromethyl group.

Of particular value are the compounds embracing the formula:

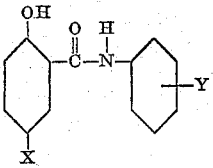

and also the compounds embraced by the formula:

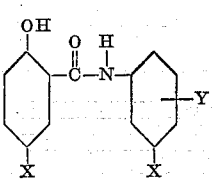

Hereafter, the trifluoromethyl group will often be referred to herein by the symbol "TFM," and the salicylanilide base will be referred to as "SA." Among the preferred compounds, made in accordance with the present invention, there are included 5-chloro-3′-TFM SA, 5-bromo-3′-TFM SA, 5-chloro-2′-TFM SA, 3,5-dibromo-3′-TFM SA, 5-iodo-3′-TFM-5′-chloro SA, 4-bromo-3′-TFM SA, 4-chloro-3′-TFM SA, 5-iodo-3′-TFM SA, 3,5-diiodo-2′-TFM SA, 4-bromo-5-iodo-2′-TFM SA, and 3-chloro-5-bromo-4′ TFM SA, and mixtures thereof.

The aforesaid TFM salicylanilides may be prepared by the method disclosed in U.S. Patent 2,731,386. For example, 5-chlor-3′-trifluoromethyl-5′-chlorosalicylanilide may be prepared by heating 5-chlorosalol with 3-trifluoromethyl-5-chloroaniline to 180°–220° C. and continuously distilling off the liberated phenol during the process. It is advantageous to use reduced pressure for this distillation and to carry out the procedure in a nitrogen atmosphere. The crude reaction product is dissolved in alcohol to which an equivalent amount of sodium hydroxide is added in the form of approximately 10N aqueous solution. The resulting solution of the sodium salt of 5-chloro-3′-trifluoromethyl-5′chlorosalicylanilide then is decolorized with charcoal and neutralized with dilute HCl. The 5-Cl-3′-TFM-5′Cl SA thus precipitated is filtered and recrystallized from ethyl alcohol, ethylacetate, or some other suitable solvent.

These compounds of the present invention are useful in compositions comprising a germicidally inert material, i.e., relatively speaking. For example, some soaps and detergents possess a bactericidal action, but such action, relative to those of the compounds of the present invention, is weak and of little effect in comparison with the overall germicidal activity of the composition. In such compositions, the compounds of the present invention may be employed in concentrations as low as 10 p.p.m., although, from a practical point of view, it is desirable ot use as much as 50 p.p.m. or 0.001% by weight, or 0.01%, and as much as 0.1%, or more. The term "germicidal activity" includes inhibiting and killing action against bacteria, fungi and similar organisms.

Particularly useful compositions of the present invention are those comprising soaps and detergents, and especially toilet soaps or cosmetic detergents in which the compounds of the present invention may be employed in concentrations of 0.1% to 0.5% by weight, or even as much as 1% or more. The term "detergent" employed herein will be used to include all synthetic and natural cleansing compositions, including cationic detergents, such as dimethyl stearamido-propyl-2-hydroxy-ammonium dihydrogen phosphate, anionic detergents such as commercial soaps, e.g., alkali metal soaps of hydrolyzed natural or synthetic glycerides of fatty and similar organic acids, e.g., sodium and potassium stearates or oleates, ampholytic detergents, such as sarcosine, non-ionic detergents, such as polyoxypropylene polyoxyethylene condensates, natural detergents, such as starches, vegetable gums, and the like, and mixtures thereof. The term "soap" employed herein is used in its popular or ordinary meaning, i.e., a cleansing composition prepared from an alkali metal compound such as potassium or sodium hydroxide and a fat or fatty acid, both saturated and unsaturated.

The compounds of the present invention possess a strong substantive action upon the skin. Thus, they will be retained on the skin for some time even after repeated washings with soap and water, and in so doing, they serve to inhibit the action of odor-forming bacteria.

One valuable use of the compounds of the present invention is the use thereof to sanitize fibrous material such as cotton gauze, dressings, textiles, paper pulp, and the like. They also serve as antiseptic agents when incorporated in plastic or rubber compositions, prior to molding into articles of commerce, such as baby rattles, gloves, food wrappers and the like.

Although the compounds of the present invention are highly effective when used alone in the form of one compound or mixtures thereof, they may also be employed in admixture with other germicides or fungicides, particularly when a synergistic effect is obtained.

The following examples illustrate the numerous advantages of the germicidal compositions made in accordance with the present invention:

*Example 1*

Bacteriological tests were performed against *Staphylococcus aureus* with a 24-hour culture at 37° C. Each of the chemicals listed below was incorporated in soap of "Ivory" brand (a neutral white high grade toilet soap consisting of a mixture of 80% sodium soap and 20% potassium soap produced from a 70% tallow and 30% coconut oil glyceride blend, in accordance with U.S. Patent 2,295,594), in 1% by weight concentration of soap and 0.1% of compound listed. Cotton disks of 10 mm. diam. were steeped in this mixture, thoroughly rinsed, dried, and applied to seeded agar in Petri dishes, and the zones of inhibition were read after 24 hours, the data obtained (average of three tests) being as follows:

| Compound: | Zone of inhibition (mm.) |
|---|---|
| 5,2'-dichloro SA | 15.0 |
| 5,3'-dichloro SA | 18.5 |
| 5,4'-dichloro SA | 21.0 |
| 5,2',5'-trichloro SA | 21.5 |
| 5-chloro-3'TFM SA | 26.0 |
| Control | 0.0 |

It will be noted that the TFM compound of the present invention exhibited much higher potency against *Staphylococcus aureus* than any of the di- or tri-halo SA compounds.

*Example 2*

In this test, each compound listed below was formulated with "Ivory" brand soap so that, on making a solution containing 8% by weight of soap, the indicated concentrations of compound were obtained. Test cloths then were dipped into each solution, rinsed once in clear water and dried. Disks (10 mm. diam.) of these cloths were placed on agar, seeded with bacteria as indicated, and incubated at 37° C. for 24 hours, the results (average of 3 tests) being as follows:

E. COLI

| Compound Concentration (p.p.m.) | 5-Cl-3'-TFM SA | 5-4'DiCl SA | 3,5,4'-Tri Cl SA |
|---|---|---|---|
| 1,600 | Slight Zone | No zone; low count under disk. | No zone; low count under disk. |
| 800 | No zone; no count under disk. | No zone; high count under disk. | No zone; medium count under disk. |
| 400 | do | do | No zone; high count under disk. |

S. AUREUS

| Compound Concentration (p.p.m.) | 5-Cl-3'-TFM SA | 5-4'DiCl SA | 3,5,4'-Tri Cl SA |
|---|---|---|---|
| 1,600 | 29.4 (mm.) | 24.0 (mm.) | 15.0 (mm.). |
| 800 | 26.0 | 19.5 | 14.5. |
| 400 | 22.5 | 0.0 | 14.0. |

NOTE.—Control: No zone; high count under disk.

These data clearly show the high germicidal retention value of the TFM compounds of the present invention upon dilution, against *S. aureus* and *E. coli*, in comparison to typical di- and tri-halogenated SA compounds.

*Example 3*

Penassay disk tests were run in the same manner as outlined in Example 1 at various compound concentrations (other factors being the same), against *S. aureus* with the following results:

| Compound Concentration (p.p.m.) | 5-Cl-3'-TFM SA | 5-4'DiCl SA | 3,5,4'-Tri Cl SA |
|---|---|---|---|
| 800 | 27.8 | 18.5 | 18.6. |
| 80 | No zone; no count under disk. | No zone; moderate count under disk. | No zone; moderate count under disk. |

*Example 4*

Skin substantivity (leaching) tests were conducted by applying aqueous solutions (in compound concentrations specified) to fresh calfskin (free of wrinkles) and subjecting the treated skin to clear water leaching for 5 minutes. In performing this test, a section of fresh calfskin (about 3" x 4") is subjected to a washing procedure in the same manner as the back of the hand might be washed using the treated soap either in liquid form or as a lather. The treated skin then is rinsed thoroughly with moderate rubbing in a manner similar to washing the hands.

When this treatment is completed, disks are cut out of the center portion of the calfskin pieces with an instrument such as a sterile cork borer. The resulting disks then are placed on nutrient agar with the epidermis side down, the agar previously being seeded with *Staphylococcus aureus*. After incubation at 37° C. for 24 hours, zones of inhibition (average of 3 tests) are read and compared with the controls, the data obtained being as follows:

| Compound Concentration (p.p.m.) | 5-Cl-3'-TFM SA | 5-4'DiCl SA | 3,5,4'-Tri Cl SA |
|---|---|---|---|
| 800 | 29.8 | 20.5 | 21.2. |
| 400 | 26.6 | 18.2 | 21.0. |
| 80 | 19.8 | very strong growth | Very strong growth. |
| 40 | Slight growth | do | Do. |

*Example 5*

Standard toxic dilution tests were made against two organisms, using "Ivory" brand soap to which had been added 1% by weight of compound specified. The indicated dilutions, made from the stock soap solution, gave the following results (average of 3 tests):

| Compound | E. Coli—Dilution (p.p.m.) | | | |
|---|---|---|---|---|
| | 50 | 25 | 10 | 5 |
| Control | TNTC[1] | TNTC | TNTC | TNTC |
| 3, 5, 4-TriCl SA | TNTC | TNTC | TNTC | TNTC |
| 3, 5-DiCl-3'-TFM-4'Cl SA | TNTC | TNTC | TNTC | TNTC |
| Tetramethyl thiuram disulfide (TMTD) | 0 | TNTC | TNTC | TNTC |
| Hexachlorophene ("G-11" brand) | 0 | 0 | TNTC | TNTC |
| 5, 4'DiCl SA | 0 | 0 | 35 | TNTC |
| 5, 4'-DiBr SA | 0 | 0 | 29 | TNTC |
| 5-Cl-3'-TFM SA | 0 | 0 | 0 | 160 |
| 5-Br-3'-TFM SA | 0 | 0 | 0 | 120 |
| 3, 5-DiBr-3'-TFM SA | 0 | 0 | 0 | 110 |
| 5-Cl-2'-TFM SA | 0 | 0 | 0 | 100 |
| 5-I-3'-TFM-5'Cl-SA | 0 | 0 | 0 | 0 |

[1] TNTC=Too numerous to count.

The above data show that the only compounds effective in 10 p.p.m. dilution were those of the present invention, the most effective being 5-iodo-3'trifluoromethyl-5'-chloro salicylanilide. The data also show that trifluoromethyl compounds containing a halogen adjacent to the TFM groups are much less active toward *E. coli* than similar homologs in which tahe halogen is not adjacent.

*Example 6*

Toxic dilution tests were made as in Example 5, against *S. typhi*, with the following results:

| Compound | S. Typhi—Dilution (p.p.m.) | | | |
|---|---|---|---|---|
| | 50 | 25 | 10 | 5 |
| Control | TNTC | TNTC | TNTC | TNTC |
| 5, 4'-DiCl SA | TNTC | TNTC | TNTC | TNTC |
| 3, 5, 4'-TriCl SA | TNTC | TNTC | TNTC | TNTC |
| 3, 5, DiCl-3'-TFM-4'Cl SA | TNTC | TNTC | TNTC | TNTC |
| TMTD | 0 | 8000 | TNTC | TNTC |
| 5-Cl-3'-TFM SA | 0 | 0 | 250 | 10,000 |
| 5-Cl-2'-TFM SA | 0 | 0 | 230 | 8,500 |
| 5-Br-3'-TFM SA | 0 | 0 | 225 | 8,000 |
| 5-I-3'-TFM SA | 0 | 0 | 200 | 9,000 |
| 3, 5-DiBr-3'-TFM SA | 0 | 0 | 100 | 4,000 |
| 3, 5, 2'-TriCl-4'-TFM SA | 0 | 0 | 100 | 3,000 |
| 3, 5, 6'TriCl-3'-TFM SA | 0 | 0 | 50 | 1,000 |

Again, in this series, the compounds of the present invention were the only ones which were effective completely at 25 p.p.m. concentration. One of the most effective compounds in this case was 3,5-dibromo-3'-trifluoromethyl salicylanilide. Addition of a chlorine in the 4' position to this compound practically killed its potency.

*Example 7*

Penassay disk tests were run as outlined in Example 1 with the exception that the germicidal compound was used in 1% concentratin (on the soap weight basis), and the soap-germicide concentration was 5% on the basis of the water weight, thus providing a final germicide concentration of 0.05%. The data obtained are as follows (average of 6 replicates):

L. casei[1]
Compound: Inhibition zone, mm.
    Hexachlorophene ("G-11" brand) _____ 15.5
    5,4'-DiClSA _____ 15.5
    5-Cl-3'-TFM SA _____ 17.0
    Control _____ 0.0

[1] Microinoculum; 1% inoculum on disk.

Here again, the TFM compound of the present invention proved to be superior against *L. casei* when compared against commercial germicides.

*Example 8*

This test involved the deep broth culture method wherein a standard clear sterilized beef broth is used, to which is added one of the compounds to give the final concentrations as indicated. These compound solutions were inoculated with *E. coli*, incubated for 24 hours at 37° C., and observed for the presence of organism growth as exhibited by development of cloudiness or haze in the beef broth. An amount of 0.1 ml. of germicide compound per 20 ml. of organism culture broth was used. The results obtained are as follows (growth indicated by "+," no growth by "0"):

| Compound | Dilution (p.p.m.) | | | |
|---|---|---|---|---|
| | 50 | 25 | 10 | 5 |
| Control | + | + | + | + |
| Hexachlorophene | 0 | 0 | + | + |
| 5,4'-DiCl SA | 0 | 0 | + | + |
| 5-Cl-3'-TFM SA | 0 | 0 | 0 | + |
| 3,5,2'-TriCl-4'-TFM SA | 0 | 0 | 0 | + |
| 3,5,5'-TriCl-3'-TFM SA | 0 | 0 | 0 | ± |

The TFM compounds of the present invention were the only germicides effective in 10 p.p.m. dilution.

*Example 9*

Pooled saliva toxic dilution tests were run as in Example 5 with the exception that pooled saliva was used in place of water for dilution. The results obtained were as follows:

| Compound | Dilution (p.p.m.) | | |
|---|---|---|---|
| | 50 | 25 | 10 |
| Control | + | + | + |
| 4,2',4',6'-Tetra Br SA | + | + | + |
| 3,4-DiBr-3'-TFM SA | + | + | + |
| 5,3'-4'-TriBr SA | + | + | + |
| 4-Cl-3'-TFM-4'-Cl SA | + | + | + |
| 4,3'-DiBr SA | 0 | 0 | + |
| 5,3'-DiBr SA | 0 | 0 | + |
| 5,3'-DiCl SA | 0 | 0 | + |
| 4,3'-DiCl SA | 0 | 0 | + |
| 5,3'-DiI SA | 0 | 0 | + |
| 4-Br-3'-TFM SA | 0 | 0 | 0 |
| 5-Br-3'-TFM SA | 0 | 0 | 0 |
| 5-Cl-3'-TFM SA | 0 | 0 | 0 |
| 4-Cl-3'-TFM SA | 0 | 0 | 0 |
| 5-I-3'-TFM SA | 0 | 0 | 0 |
| 3,5-DiBr-3'-TFM SA | 0 | 0 | 0 |
| 3,5,2'-TriCl-4'-TFM SA | 0 | 0 | 0 |
| 3,5,5'-TriCl-3'-TFM SA | 0 | 0 | 0 |

It will be noted again that only the TFM compounds of the present invention without said adjacent substituent positions were effective at 10 p.p.m. dilution. Also, the tests show that TFM compounds having adjacently disposed halogens (other than in the TFM group), such as 3,4-dibromo-3'-trifluoromethyl SA, possess no germicidal effectiveness at the indicated dilutions.

*Example 10*

Penassay cotton disk tests were run as in Example 5 on the compounds listed, and the following results were obtained (triplicate averages):

Compound:      *S. aureus* Zone of inhibition (mm).
- Control — 0.0
- 4,2',4',6'-TetraBr SA — 13.4
- 5,3',4',-TriBr SA — 13.5
- 4-Cl-3'TFM-4'-Cl SA — 14.5
- 3,4-DiBr-3'-TFM SA — 15.0
- 4,3'-DiCl SA — 25.1
- 4,3'-DiBr SA — 25.2
- 5,3'-DiCl SA — 25.2
- 5,3'-DiI SA — 25.2
- 5,3'-DiBr SA — 25.3
- 4-Cl-3'-TFM SA — 27.9
- 5-Br-3'-TFM SA — 28.1
- 5-I-3'-TFM SA — 28.1
- 3,5-DiBr-3'-TFM SA — 28.2
- 5-Cl-3'-TFM SA — 28.2
- 4-Br-3'-TFM SA — 28.3
- 3,5,5'-TriCl-3'-TFM SA — 28.3
- 3,5,2'-TriCl-4'-TFM SA — 28.4

Also in this case, it will be noted that the TFM compounds of the present invention without halogens adjacent to the TFM group exhibited the highest germicidal effect. The relative ineffectiveness of compounds having a halogen adjacently disposed to the TFM group, as exhibited by 4-chloro-3'-trifluoromethyl-4'-chloro salicylanilide, also is observable.

I claim:

1. A germicidal composition comprising a detergent and at least 0.01% by weight of a compound embraced by the formula:

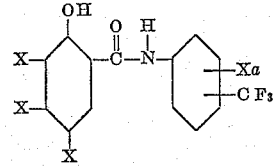

wherein X is a hydrogen-substituting atom selected from the class consisting of the halogens chlorine, bromine and iodine, and $a$ is a number ranging from 0 to 2, said compound containing one to three halogen atoms none of which being positioned adjacent the $CF_3$ group and, when containing more than one halogen atom, none of the halogen atoms being positioned adjacent to each other.

2. A germicidal composition comprising a fibrous material and at least 0.01% by weight of a compound embraced by the formula:

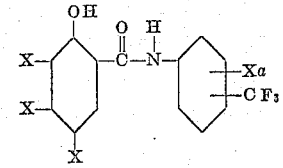

wherein X is a hydrogen-substituting atom selected from the class consisting of the halogens chlorine, bromine and iodine, and $a$ is a member ranging from 0 to 2, said compound containing one to three halogen atoms none of which being positioned adjacent the $CF_3$ group and, when containing more than one halogen atom, none of the halogen atoms being positioned adjacent to each other.

3. A germicidal composition comprising a detergent and at least 0.001% by weight of 5-chloro-3'-trifluoromethyl salicylanilide.

4. A germicidal composition comprising a detergent and at least 0.001% by weight of 5-bromo-3'-trifluoromethyl salicylanilide.

5. A germicidal composition comprising a detergent and at least 0.001% by weight of 5-iodo-3'-trifluoromethyl salicylanilide.

6. A germicidal composition comprising a detergent and at least 0.001% by weight of 3,5-dichloro-3'-trifluoromethyl salicylanilide.

7. A germicidal composition comprising a detergent and at least 0.001% by weight of 5-chloro-3'-trifluoromethyl-5'chloro salicylanilide.

References Cited in the file of this patent

UNITED STATES PATENTS

| 2,703,332 | Bindler | Mar. 1, 1955 |
| 2,906,711 | Stecker | Sept. 29, 1959 |

FOREIGN PATENTS

| 745,607 | Great Britain | Feb. 29, 1956 |